United States Patent [19]

Jones et al.

[11] Patent Number: 5,263,080
[45] Date of Patent: Nov. 16, 1993

[54] TELEPHONE MESSAGE STORAGE SYSTEM WITH OUT-OF-BAND SIGNALLING

[75] Inventors: Scott A. Jones, Cambridge; Donald F. Picard, Medford; James A. Hamilton, Carlisle; Eric A. Houston, Cambridge; Stephen R. Kowal, Arlington, all of Mass.

[73] Assignee: Boston Technology, Inc., Wakefield, Mass.

[21] Appl. No.: 531,633

[22] Filed: Jun. 1, 1990

[51] Int. Cl.⁵ .............................................. H04M 1/64
[52] U.S. Cl. ........................................ 379/88; 379/67; 379/89; 370/110.1; 370/60
[58] Field of Search ...................... 379/89, 88, 67, 230, 379/333, 334, 112, 199, 44, 144, 145, 155, 201; 370/60, 61, 60.1, 56, 76, 110.1

[56] References Cited

U.S. PATENT DOCUMENTS

| | | | |
|---|---|---|---|
| 4,612,416 | 9/1986 | Emerson et al. | 379/88 |
| 4,694,483 | 9/1987 | Cheung | 379/112 |
| 4,792,968 | 12/1988 | Katz | 379/67 |
| 4,825,460 | 4/1989 | Carter et al. | 379/89 |
| 4,933,967 | 6/1990 | Lo et al. | 379/89 |
| 4,935,956 | 6/1990 | Hellwarth et al. | 379/155 |
| 5,003,577 | 3/1991 | Ertz et al. | 379/89 |
| 5,043,983 | 8/1991 | Dorst et al. | 370/110.1 |

Primary Examiner—Jin F. Ng
Assistant Examiner—Huyen D. Le
Attorney, Agent, or Firm—Staas & Halsey

[57] ABSTRACT

A pay telephone message system is disclosed that includes a voice message system storing and forwarding to a destination telephone a voice message left by a user. Call information including the destination telephone number is routed out-of-band, that is, in a data or service request channel separate from the voice channel, over a packet concentrator network separate from the voice telephone network. During operation a message telephone call is placed to the voice message system over the existing telephone network. The call information is routed over the concentrator network as a voice message service request. The voice message system returns a token, a call identifier or service request number, corresponding to the service request to the pay telephone interface making the request and handling the pay telephone call. The interface sends the token in-band over the telephone network to the voice message system prior to allowing the pay telephone user to store a message. The token allows the voice message system to correlate the incoming voice message with the call information.

22 Claims, 10 Drawing Sheets

Microfiche Appendix Included
(479 Microfiche, 5 Pages)

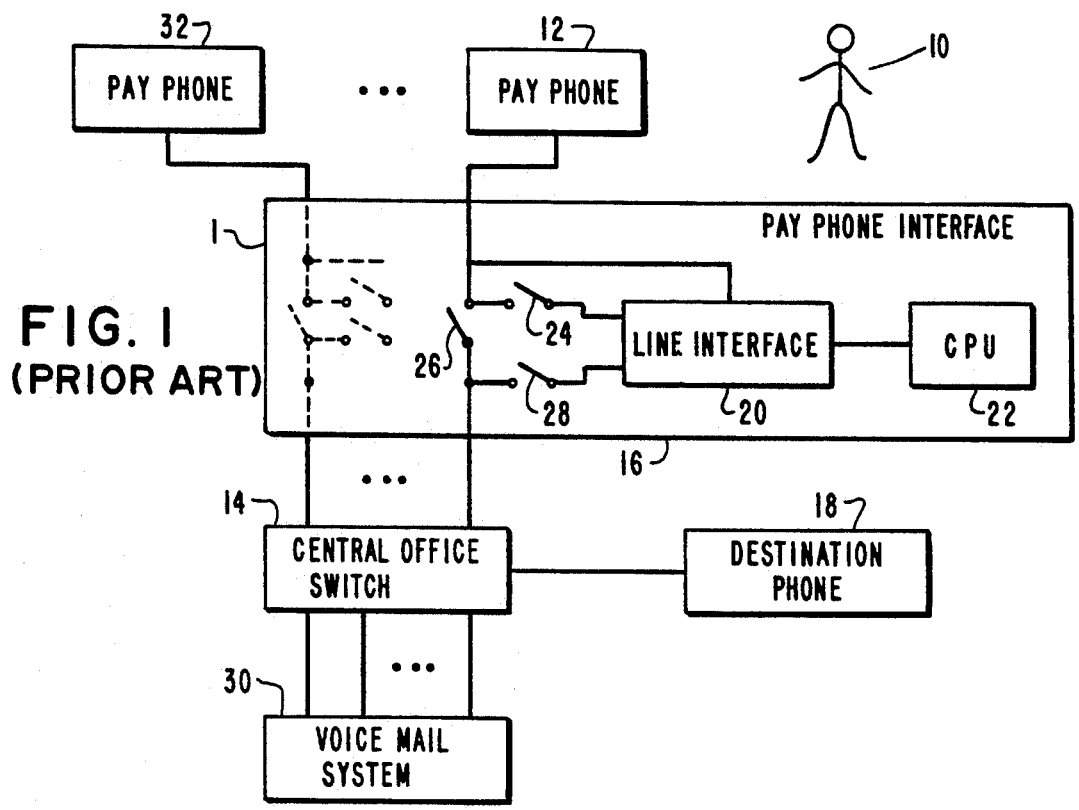
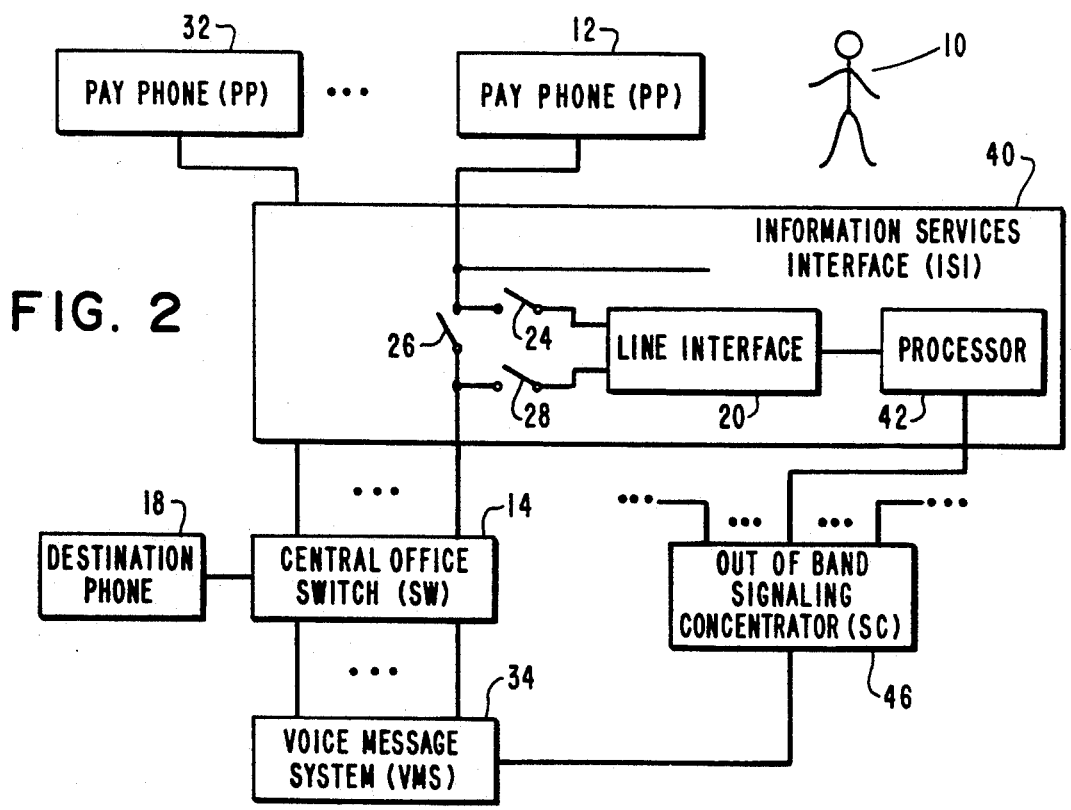

TELEPHONE MESSAGE STORAGE SYSTEM WITH OUT-OF-BAND SIGNALLING

MICROFICHE APPENDIX

A microfiche appendix is incorporated by reference herein having 5 fiche and 479 frames.

CROSS REFERENCE TO RELATED APPLICATIONS

This application is related to U.S. applications entitled Voice Mail System by Crane et al. having U.S. Ser. No. 423,110 and entitled Telephone Communication System by Jones et al. having U.S. Pat. No. 5,029,199 both of which are incorporated by reference herein.

BACKGROUND OF THE INVENTION

1. Field of the Invention

The present invention is directed to a telephone voice message system that uses out-of-band signalling, that is, sends call record information in a data channel separate from the voice channel and, more particularly, to a system particularly suited for storing and forwarding messages from pay telephone users in which the information, with respect to telephone call source and destination, is transferred via an out-of-band signalling concentrator network to the voice mail system which stores the message from the pay telephone user received over a separate telephone network.

2. Description of the Related Art

In general, during a typical pay telephone message storage operation, as illustrated in FIG. 1, the pay telephone user 10, using pay telephone 12, receives a dial tone from a central office switch 14 through a pay telephone interface unit 16. When the dial tone is received the pay telephone user tone dials the destination telephone 18. During the telephone call, the pay telephone interface 16, through a line interface 20 and a computer 22, monitors the progress of the call and stores information related to the call, such as the destination telephone number, the credit card number, etc. If the computer 22 detects a busy signal or a ring no answer, computer 22 will close switch 24, thereby splitting the line, and provide the user 10 with a series of voice prompts which ask the user 10 if the user 10 wishes to leave a message for the destination telephone 18. If the user 10 responds with the appropriate tone signals and coin drops and the destination telephone 18 has not answered, the computer 22 will open switch 26 and interrupt the ongoing call through the central office switch 14 to the destination telephone 18. The computer 22 will then close switch 28 seizing the local trunk, obtain a dial tone from the central office switch 14, output appropriate coin drop tones and place a telephone call to the voice mail system 30. When the voice mail system 30 answers the call, the computer 22 will transmit call record information over the telephone lines to the voice mail system 30 using conventional dual tone multifrequency signalling (DTMF). When the call record information is transmitted over the telephone lines in the same channel as the voice signal in this manner it is called in-band signalling. The call information includes for example the telephone number of the pay telephone, the telephone number of the destination telephone, the amount of money deposited by the pay telephone user 10, or credit card number, etc. Once this call information is transmitted to the voice mail system 30, the computer closes switch 26, provides the appropriate prompts to the telephone 12 indicating to the user 10 that the user 10 should leave a message after hearing a tone and issues a tone through switch 24 to the telephone 12. The user 10 then proceeds to leave a message. When the message is complete and after the voice mail system 30 allows the user 10 to review the message if desired, the CPU 22 detects an on-hook and terminates the call by opening switches 26, 28 and 24. After a predetermined time the switch 26 is again closed to allow the pay telephone 12 to receive a dial tone from the central office 14 when the handset is lifted. Later the voice mail system 30 places a call to the destination and outputs the stored message.

The typical in-band signalling operation for a telephone service request includes at least 52 tone digits which require approximately 20 seconds. This is time during which a line through one or more central office switches are occupied and during which the voice mail system 30 is also tied to the particular pay telephone placing the call.

In the prior art, as exemplified by FIG. 1, when it was necessary to perform an administration or configuration function, such as changing the amount of money necessary to leave a message, how many rings to allow before no answer is indicated or which voice mail system to use, the field personnel typically hand carry an administration terminal to each interface 16 and change the parameters manually.

SUMMARY OF THE INVENTION

It is an object of the present invention to improve telephone system and voice message system usage efficiency.

It is also an object of the present invention to improve the speed of the pay telephone message operation.

It is an additional object of the present invention to allow system configuration, statistics collection and administration of a pay telephone message system from a central location.

It is a further object of the present invention to reduce idle telephone network use by users of pay telephones.

It is also an object of the present invention to provide increased call record information transmission reliability because noise and distortion on the telephone network will not affect service requests to the voice message system when sent out-of-band.

It is another object of the invention to transmit call record information out-of-band to increase the immunity of the voice message system from unauthorized message storage access It is another object of the present invention to allow remote maintenance and upgrading of telephone interfaces.

It is still a further object of the present invention to provide a system that allows centralization of alarms and status in pay telephone interface systems.

It is also an object to provide for centralized software updates for interface systems.

The above objects can be attained by a system which performs out-of-band signalling, that is, information transfer in a channel different from the voice channel, of call record information for a pay telephone user desiring to leave a message. The out-of-band signalling is performed through a concentrator network which carries the signalling information to the voice message system from several pay telephone information services interface units without occupying the telephone network during the signalling operation. The concentrator network also allows centralized configuration, administration and statistics collection.

These together with other objects and advantages which will be subsequentially apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 illustrates a prior art pay telephone voice mail system;

FIG. 2 illustrates the pay telephone voice message out-of-band signalling system of the present invention;

DESCRIPTION OF THE PREFERRED EMBODIMENT

Figure 3:
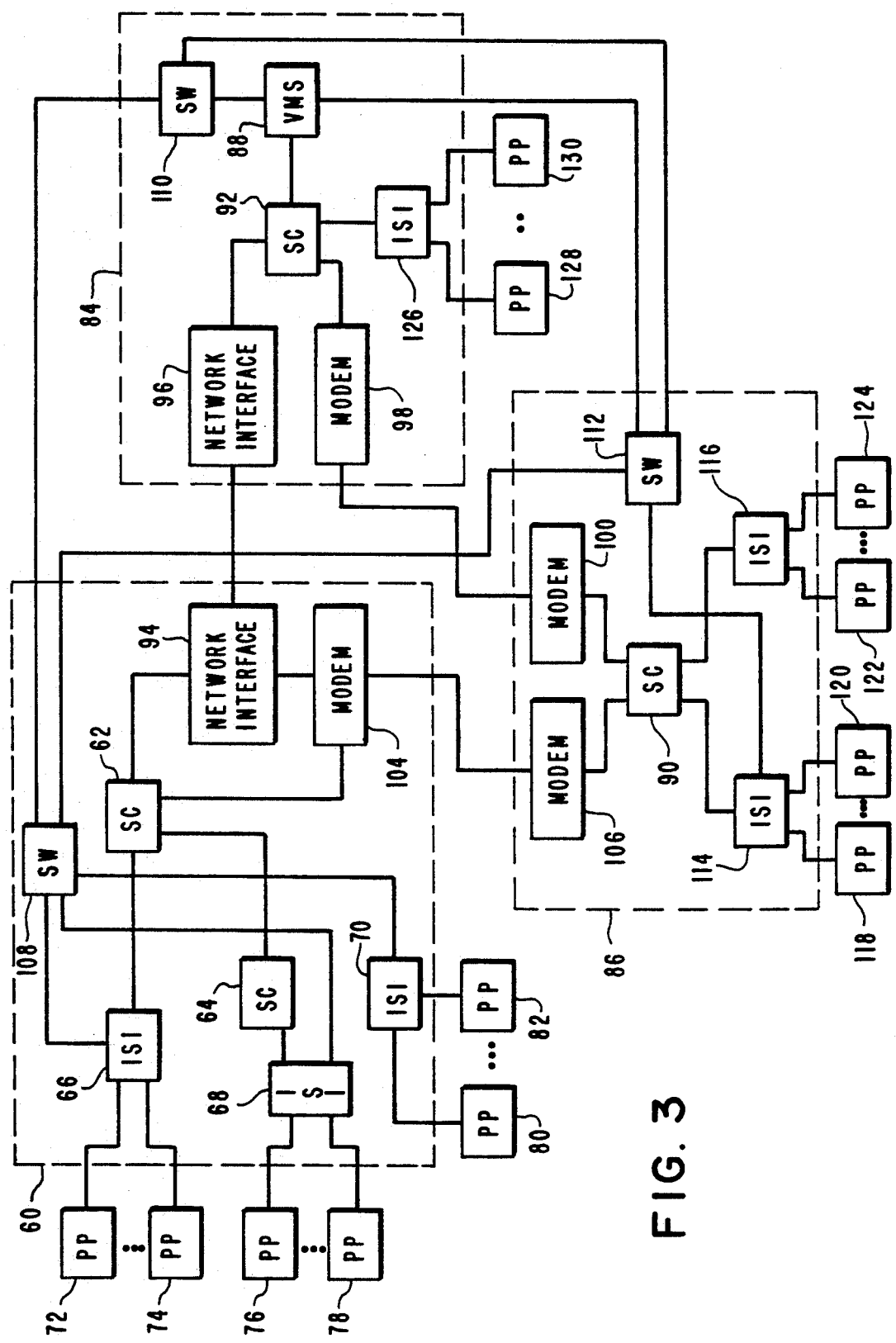
FIG. 3 illustrates various network configurations of the present invention.

Up until the start of the DTMF signalling operation by the conventional pay telephone interface 16 the present invention, as illustrated in FIG. 2, performs the same functions and operates in a substantially identical manner. At the time that the information services interface (ISI) 40 of the present invention starts to place the telephone call through switch 28 and central office switch (SW) 14 to a voice message system (VMS) 34, the processor 42 instead requests voice message service from VMS 34 through concentrator (SC) 46 using out-of-band signalling over dedicated concentrator network circuits, that is, the service request is sent from the processor 42 to the VMS 34 via a data or service request channel separate from the voice channel over which the voice message for storage will be sent. The request for service includes the call record information normally sent in-band. The VMS 34 returns a reply to the ISI 40 via the concentrator 46, using out-of-band signalling. The reply includes a token or call identifier which will be used to identify the incoming pay telephone message call. The processor 42 while awaiting the reply token hangs up the user's call to the central office switch 14 by opening switch 26. The processor 42 then seizes the trunk to the central office switch 14 by closing switch 28 and sends the appropriate coin tones to the central office switch followed by the telephone number of the VMS 34. If the VMS 30 answers after the processor 42 receives the token through the concentrator 46 and provides the appropriate start digit (tone), the processor 42 transmits log-on tones followed by the token using DTMF in-band signalling through the switch 14 to the VMS 30. If the token has not arrived through the concentrator 46, the processor 42 performs the conventional in-band signalling to transmit the call record information through the switch 14 to the VMS 34. After the token is transmitted through the switch 14 to the VMS 34 and the processor 42 has received an acknowledgement, the processor 42 closes switch 26 and VMS 34 plays the appropriate prompts indicating to the user to leave a message. The token sent by the ISI 40 over the telephone line through the switch 14 to the VMS 34 allows the VMS 34 to correlate the incoming telephone call with the call record information of the service request previously received through concentrator 46. After the message is stored by the user 10 and the processor 42 detects an on-hook by the telephone 12, the switches 28 and 24 are disconnected. The VMS 34 during the voice message storage operation could allow the user to listen to and revise the message and, if desired, could allow the user to change the destination. The VMS 34 after a predetermined period of time and for a predetermined number of times, in a conventional manner, attempts to place a telephone call through the central office switch 14 to the destination telephone 18. When the destination telephone 18 answers (goes off hook), the VMS 34 plays the message from the user to the destination telephone 18.

The out-of-band signalling concentrator 46, in addition to forwarding the service request and reply token, also gathers statistics with respect to telephone calls made from the pay telephones which are stored on a statistics log and retrievable by a system coordinator to be discussed in more detail later.

As illustrated in FIG. 3, the concentrators SC can be configured in a variety of arrangements. For example, a central office 60 can include several concentrators 62 and 64 which serve a multitude of information services interfaces 66 through 70 handling a large number of pay telephones 72 through 82. A concentrator will service 120 information service interfaces which will each serve 8 pay telephones for a total of 960 pay telephones. As can be seen in FIG. 3, several locations 60, 84 and 86, such as local or distant central offices can store messages in a single voice message system 88 by routing the tokens and call information records between concentrators 62, 90 and 92 over, for example, a packet network which uses network packet interfaces 94 and 96 or using conventional modems 98 and 100. It is even possible, if for example the network connection between interfaces 94 and 96 fails, for concentrator 62 to route the service request including the call record information to concentrator 92 through modem 104, modem 106, concentrator 90, modem 100 and modem 98. The use of such a network allows a single voice message system to store pay telephone messages from a very large region within a telephone system. Of course the message telephone call to the VMS 88 can also be routed to the VMS 88 through several central office switches 108, 110 and 112 as the need arises.

A detailed description of the preferred voice message system 34 available from Boston Technology is found in U.S. Pat. No. 5,029,199 previously mentioned. The operation of the software in the voice message system 34 for performing the pay telephone application will be discussed in detail later herein, however, the microfiche appendix of this application includes the preferred "C" source code of the pay telephone application executed by the voice message system 34 as well as the source code of the concentrator 46 and information services interface 40.

Figure 4:
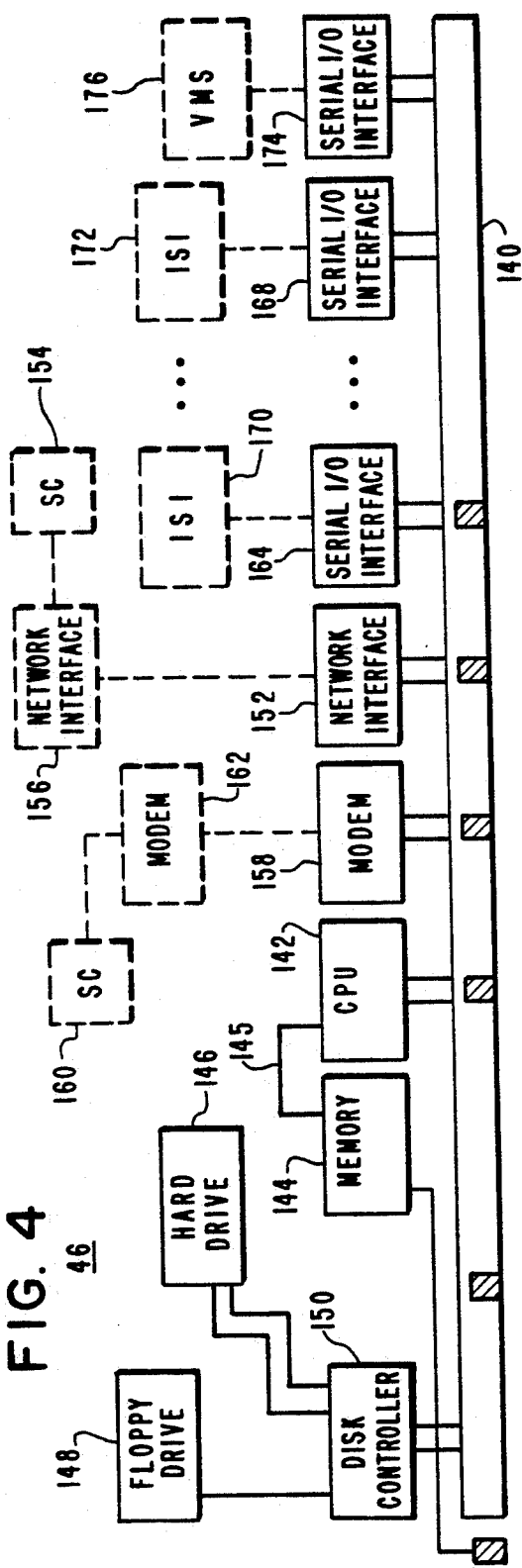
FIG. 4 illustrates the hardware of the network concentrator illustrated in FIG. 2.

FIG. 4 illustrates the hardware of the concentrator 46 where each concentrator is essentially an IBM AT type computer with special communication cards mounted on the passive back plane 140. The CPU 142 is based on the Intel 80386 processor and an appropriate unit is available from Sigma Design of Freemont, Calif. as model number CPA3820BACX. The CPU 142 executes the appropriate operations for routing service requests, tokens etc. to the destination locations and stores the data structures necessary for this routing. The operations of the CPU 142 will be discussed in more detail later herein. The preferred operating system is a conventional Xenix system. The CPU 142 accesses a memory unit 144 preferably configured for four megabytes of random access memory. A suitable memory unit 144 is available from Sigma Design of Freemont, Calif., as model CMA380KOON while the memory chips for the unit can be obtained from Centon of Wilmington, Mass. The CPU 142 has direct access to the memory 144 via a conventional 32 channel bus 145. The software executed by the CPU and the statistics collected by the CPU 142 are stored on a hard disk drive 146 preferably having a 760 megabyte storage capacity. A floppy disk drive 148 is also provided for system updates. The operation of the floppy drive 148 and hard drive 146 is controlled by a disk controller 150. The hard drive 146 is available from Anthem of Wilmington, Mass. as Maxstor model number XT8760E. The floppy disk drive is preferably a Fujitsu model M2553K03A while the disk controller is available from DPT of Matland, Fla. as model number PM301/75. The concentrator 46, as a straight forward enhancement, could include a conventional Ethernet internal communications link 152 which is available from Excelan of Nashua, N.H. as model number 9900615-01. The network interface 152 communicates to a remote concentrator 154 through a network interface 156 as discussed previously With respect to FIG. 3. The concentrator 46 can also include a modem 158 which allows the concentrator to communicate with a distant concentrator 160 through a modem 162 as previously discussed with respect to FIG. 3. The concentrator also includes 120 conventional RS232 serial interfaces 164-168 which communicate with the local information services interfaces 170 and 172. The concentrator 46 further includes a serial I/O interface 174 for communicating with the voice message system 176 or with another locally located concentrator. Of course pairs of modems can be positioned between a concentrator and an ISI if needed. The interface cards and modem cards are called communication ports.

Figure 5:
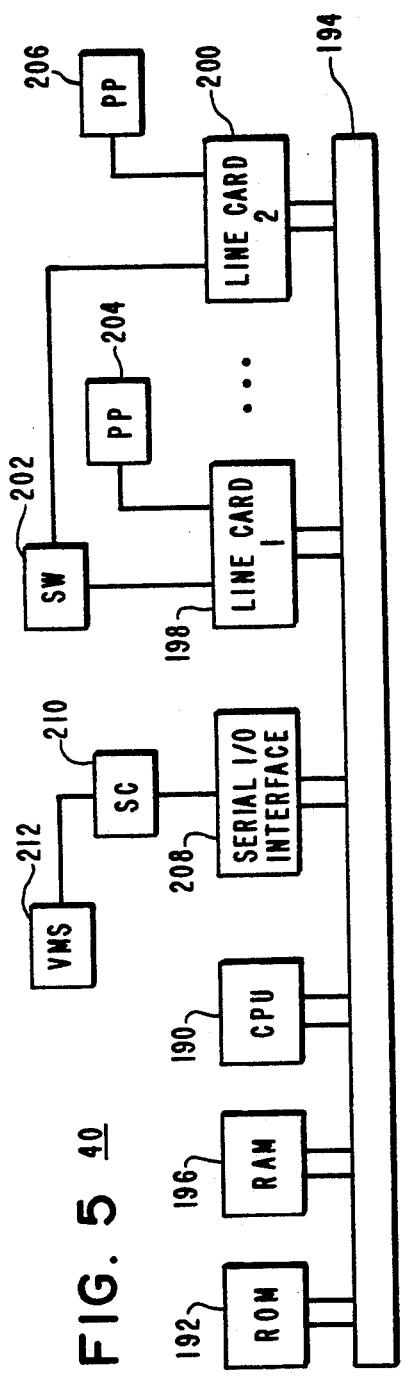
FIG. 5 illustrates the hardware of the information services interface of FIG. 2.

The configuration of the information services interface 40 is illustrated in FIG. 5. The unit 40 includes a CPU 190 based on the Motorola 68008 microprocessor architecture. The control program and the translation table, to be discussed in more detail later, is stored in a 64K read only memory (ROM) 192 and is accessed over a backplane 194. Dynamic information such as the telephone number called is stored in a 32K random access memory (RAM) 196. The ISI 40 includes 8 line cards 198 and 200 for monitoring, interrupting and placing calls between the central office switch 202 and the pay telephones 204 and 206 to thereby establish a voice channel to the VMS 212. These components 190-200 are described in detail in the related application having U.S. Ser. No. 423,110. The ISI 40 also includes a standard RS232 serial I/O interface for communicating to the VMS 212 via the concentrator 210 thereby establishing a data or service request channel between the ISI 40 and VMS 212. The line cards 198 and 200 are addressable objects within the system. The software executed by the CPU 190 of the ISI 40 will be discussed in detail later herein.

All objects within the present invention to which messages (information packets) can be directed have addresses. These objects include the VMS 34, concentrators 46, ISI CPUs 42 and ISI line cards 212-214. It is preferable that each address be absolute that is that all nodes in the network refer to a given object using the same address. It is preferable that the addresses be designed to be unique throughout the United States, so that networks can be merged and expanded without massive reconfiguration. Each address is a 6 byte value which is essentially an extended station ID or telephone number. If the address corresponds to a real, externally assigned telephone number, such as is the case for an ISI (Information Services Interface) line card 212, the first byte is zero and the remaining 5 bytes contain the 10 digits of the telephone number packed 2 digits per byte. As previously mentioned, ISI line cards and the voice message system 34 have real telephone numbers. ISI CPUs and concentrators do not, so their addresses are constructed by choosing a non-zero first byte, followed by an arbitrary 10 digit number which can be chosen in a number of different ways. However, to produce a unique address for all objects in the system the following algorithm can be used: 1. For each ISI CPU, arbitrarily choose one of the 8 lines and assign the line telephone number, together with a first byte of one as the address of the ISI CPU. 2. The address is propagated to the first concentrator node. 3. If the node reached already has an address, stop. 4. Otherwise increment the first byte and use the address with the newly incremented byte as the address for that object and continue by applying step 3 to each concentrator or VMS which is an immediate neighbor of this concentrator. This algorithm is executed by the configuration program to be discussed in more detail later.

The present invention utilizes four different databases and a statistics log. Two of the databases, the configuration database 250 illustrated in FIG. 6 and the routing database 270 illustrated in FIG. 7, are maintained in a centralized location using a configuration program which will be discussed in more detail later. These two databases 250 and 270 are preferably located in a concentrator 46 in the same central office as the voice message system 34. The third database is the routing table illustrated in FIG. 8. This database is unique for each node in the system and is generated by a configuration routine and transmitted to each node in the system during network start up or reconfiguration. The fourth database, a translation map database will be discussed in more detail later.

Figure 6:
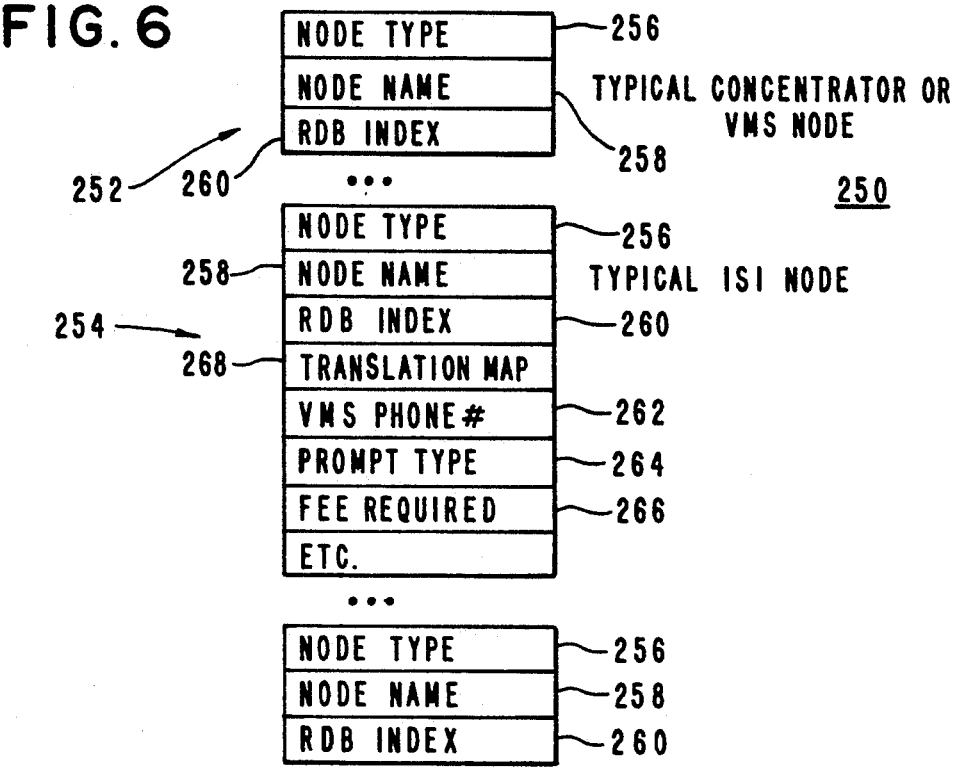
FIG. 6 depicts a system wide configuration database.
Figure 7:
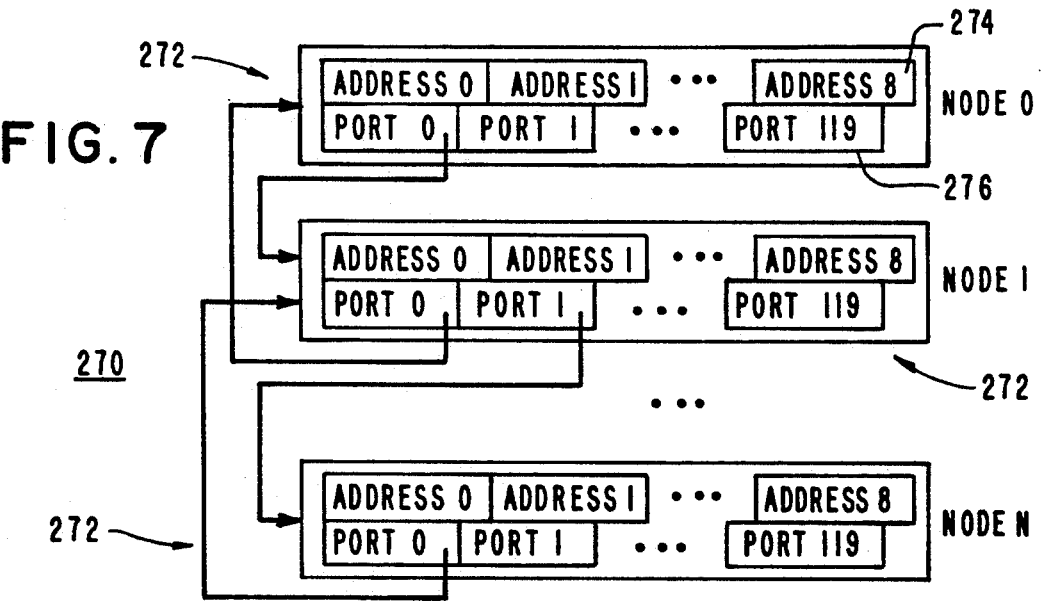
FIG. 7 depicts a system wide routing database.

The configuration database 250 illustrated in FIG. 6 includes a node record 252 for concentrators or VMS nodes and a node record 254 for ISI nodes. Each node record 252 and 254 includes a node type field 256 (VMS, concentrator or ISI), a node name field 258 and an index 260 to this node's record in the routing database as illustrated in FIG. 7. For ISI nodes only, the record also contains information required by the ISI to control its normal operation. This information is downloaded to the ISI nodes upon request by maintenance personnel. This information includes among other things a VMS telephone number 262, a prompt type 264 which determines the language to be used in playing voice prompts to the pay telephone user, information about fees 266 required for pay telephone use and voice message storage. The ISI node also includes an identifier 268 of a translation map (kept in a separate file and to be discussed in more detail later) which provides the ISI with the ability to understand the type of call being placed based on the digits being dialed as well as other information such as the access type, for example, whether the pay telephone can access MCI but not AT&T.

The routing database 270 of FIG. 7 includes a routing record 272 for each node in the system. The nodes in the routing database 270 are accessible both sequentially and directly by a 4 byte key called the RDB (routing database) index 260 (See FIG. 6). Nodes within the database are interlinked using these RDB indexes. Each node contains from one to nine addresses 274 and from one to one-hundred-twenty ports 276. The ports are RDB indexes which refer to other nodes in the database 270. An ISI node is represented by nine addresses (one for the CPU and eight for the line cards) and one port. Concentrator nodes are represented by one address and up to one-hundred-twenty ports. VMS nodes are represented by one address and typically one port. The routing database 270 and the various algorithms, to be discussed later, are indifferent to the node type.

The two databases of FIG. 6 and FIG. 7 constitute a complete configuration database which defines the configuration characteristics of the out-of-band signalling network.

Figure 8:
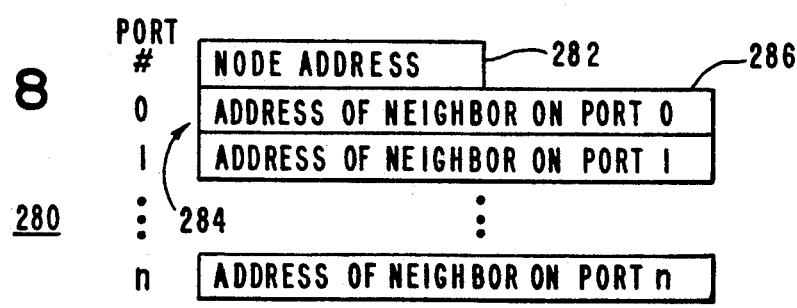
FIG. 8 depicts a node routing table.
Figure 9:
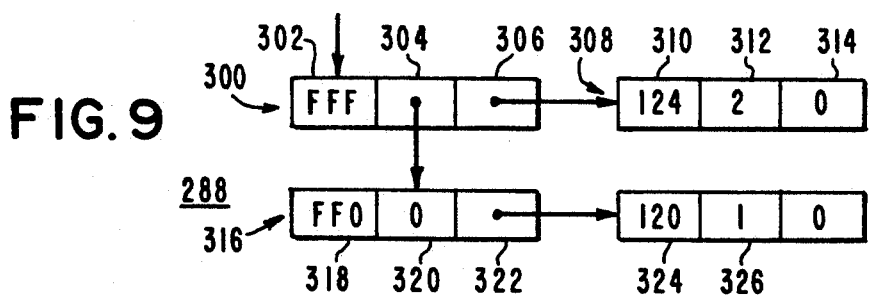
FIG. 9 illustrates a mask list provided for each address in the routing table.

The routing table 280 is illustrated in FIG. 8. Each concentrator in the network and each VMS with more than one port has a routing table 280, which is unique to that node. The routing table 280 consists of three parts. The first part is a scalar value which is the address 282 of that node. The second part 284 is a vector of up to 120 addresses which designate the addresses of immediate neighbors on the corresponding ports. The third part, illustrated in FIG. 9, is a linked list containing masks, addresses and ports, which collectively determine which port to use for the next hop toward any given destination. The masks are arranged from most specific to least specific. That is, the masks are arranged so that the first mask encountered has a list of addresses associated therewith in which the complete address must be compared to determine whether the associated port is the port through which the network message (information packet) should be sent. This type of ordering allows mistakes in mask selection to be corrected by an earlier examined more detailed mask. The masks divide the list of addresses to search into related groups. The list illustrated in FIG. 9 was generated from the following correspondence between addresses, ports and masks.

| Address | Port | Mask |
|---------|------|------|
| 123     | 1    | FF0  |
| 124     | 2    | FFF  |
| 125     | 1    | FF0  |

During operation, each of the addresses associated with the mask is compared in accordance with the mask until a match occurs which identifies the port over which the message is to be sent. For example, assume that the message to be sent has an address of 125, when the first mask 300 is obtained and the mask field 302 is examined, it indicates that it is necessary to compare all digits of the address in the corresponding list for matches. The address list entry 308 includes an address field 310, a port identification field 312 and a field 314 which points to the next entry in the list. In this situation the address 125 would be compared with the address 124 and no match would exist. The system would encounter the zero or null pointer in field 314 and move back to the list of masks and retrieve the second mask 316 which indicates that the first two digits are to be compared. To remove the need for a doubly linked list two pointers are kept, one to the current mask and one to the current address port pair. As can be seen from the table illustrated above, when the mask is FF0 only the first two digits need to be compared and the third digit can be set to a don't care value as illustrated in the address field 324. In this situation when the first two digits of the address 125 are compared to 120, a match is found and the port number 1 is retrieved from the port field 326 and the message is transmitted over port 1. The routing table creation algorithm which creates the masks as illustrated above will be discussed in more detail later. The structure of FIG. 9 is created from packets produced by a configuration routine, to be discussed later, which produces mask-address pairs. The concentrator takes the list of mask address pairs, sorts them into mask order and then creates the singly linked list of masks and addresses using conventional straight forward singly linked list creation techniques.

Each node in the network, as discussed with respect to FIG. 9 knows its own address, the addresses of the immediate neighbors and, through the masks, what messages (information packets) should be routed through each port. Each node stores this information in nonvolatile storage so that it can be used during reinitialization. To improve routing each information packet traversing the system has two fields designed to support efficient routing. These fields store the source route and the reply route as a sequence of port numbers. Each field is of a variable length and lists the outgoing logical port number to be used at each hop. The reply route always starts out empty at the source and one byte is appended at each hop. For replies, the reply route can be used as the source route in the reply packet If the source route is empty, the packet is routed using the destination address and the routing tables. If the source route is not empty, the destination address is ignored for routing and one byte of the source route is consumed at each hop.

Within the protocol used by this invention are four multiple byte data types: character string, network address, 16 bit integer and 32 bit integer. Character strings are preferably transmitted in ASCII format, a standard character representation format, in the normal left to right order and variable length strings are terminated by a single zero byte followed immediately by the next field if any. Network addresses are preferably transmitted as follows: the one byte extension is transmitted first, followed by the five bytes representing the 10 digit telephone number. The extension byte is to be interpreted as an ordinary 8-bit unsigned integer. The five bytes of the telephone number are preferably transmitted in normal left to right reading order, that is, the first two digits of the area code come in the first byte. Within a byte the first digit preferably occupies the most significant four bits and the second digit the least significant four bits. Within these four bit units, the digit is preferably represented as a normal unsigned four bit quantity. Values in the range of 10–15 are illegal and reserved for future use. 16 bit and 32 bit integers are always transmitted most significant byte first.

Figure 10:
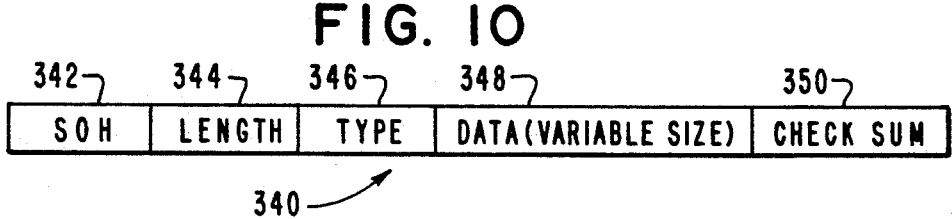
FIG. 10 illustrates the general format of messages carried by the concentrator network.

The general format of information packets 340 transmitted over the network is illustrated in FIG. 10. Each packet includes a start of header field 342, a length field 344 which indicates the length of the packet, the type of packet 346, the data of the packet 348 and a check sum 350. The start of header is one byte, the length is one byte, the type is one byte, the data is variable in length and the check sum is preferably two bytes long and represents a 16 bit unsigned sum of the bytes in the packet. In general, each completely received packet is acknowledged by a one byte acknowledgement (ACK) or a one byte negative acknowledgement (NACK) returned. A negative acknowledgement implies an incorrect check sum. It is preferred that the sender of the packet send no further packets until the previous packet has been processed successfully or a failure is determined. Incomplete packets will time out and both the sender and receiver time out preferably after two seconds. A NACKed packet or timed out packet is preferably retried twice for a maximum of three transmissions before declaring a failure. Failure actions include initiating appropriate alarm messages which are context dependent. Once a port has failed to deliver a packet, it is preferably declared down and the node will attempt to reinitialize the port. During reinitialization further attempts to deliver packets through this port will be rejected with the same failure action as though transmission was attempted and failed.

Figure 11:
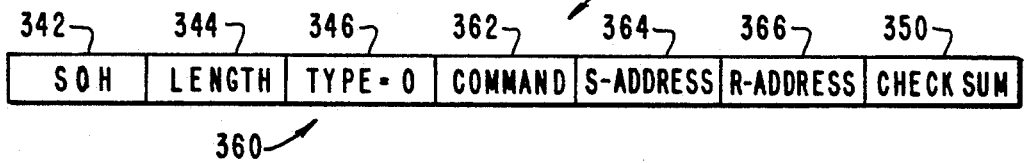
FIG. 11 shows the format for link messages.

Link level packets 360 of the present invention are formatted in accordance with FIG. 11. The data 348 carried by a link level packet 360 includes a one byte command field 362, a six byte sender's address field 364 and a six byte receiver's address field 366. The commands include a no-op (no operation) command which causes the receiver to only send an acknowledgement and is generally used to determine if the link between the sender and receiver is up. Initialization commands are used when a node reboots or initializes and the primary purpose is to verify address relationships in order to detect reconfigurations of the system. The initialization commands include the assert command which is sent each time the port is initialized. The assert packet includes the sender's current idea of its own address and the immediate neighbor's address on that port. The receiver checks these addresses against its own routing table and replies with an accept packet. If the addresses match both sides declare the ports usable. If the assert command fails due to a time out, the port will remain unusable and the assert command will be periodically retried. If the addresses mismatch, the receiver replies with a deny packet whereupon both sides declare their respective ports closed. No further action is taken until one side issues a set address command in response to a connect command which will be described later, as a result of which both sides now have matching addresses and the ports become usable again. The set address command causes the node to change its address. Whenever a node's own address changes as a result of a set address command, all other active ports that are still using the old address are closed pending receipt of a corresponding set address packet.

Figure 12:
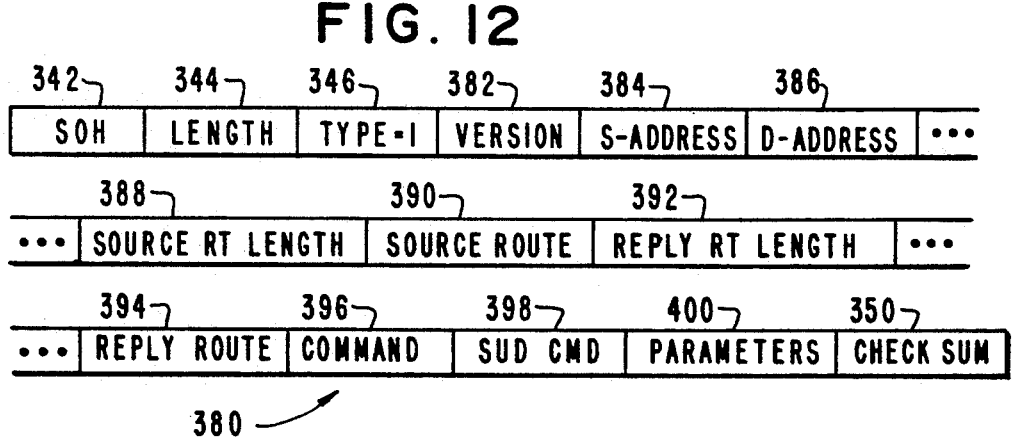
FIG. 12 depicts the format for network messages.

The preferred format for network packets is illustrated in FIG. 12. The data field of the network packet 380 includes a one byte version field 382 which indicates the protocol version being implemented by the system, a source address field 384 six bytes long and a destination address field 386 also six bytes long. As previously mentioned, network packets include a source route and a reply route, and as a result, the data field also includes a source route length field 388 and the actual source route 390 which is of course a variable length, and a reply route length field 392 followed by the actual reply route 394. The message also includes a one byte command 396, a one byte subcommand 398 and parameters associated with the command and subcommand. The parameters field is of variable length. The transmission of the packet illustrated in FIG. 12 sends a message from the source to the destination using the source route if provided. If the length of the source route is zero it implies that there is no source route and the destination address is used for routing at each node. At each hop, the incoming port number is preappended to the reply route such that the destination can use it as the source route for a reply.

Within the network messages or packets, as illustrated in FIG. 12, are included VMS service request messages, statistics gathering messages, routing messages, configuration messages and alarm messages. When the subcommand field indicates that the message is an alarm message, the parameter field 400 indicates whether the port is down because of a time out, a check sum error or awaiting a carrier, indicates whether the port is closed, indicates whether no such port can be found in the source route and whether a route can be found and indicates whether there are too many hops (that is, a routing loop has been detected). An alarm message is generated whenever a packet cannot be sent on to its next hop. In this situation, the original source address becomes the destination address, the node detecting the failure is the source address and the reply route to that point is used as a source route. The command field is the same as in the original message.

Figure 13:
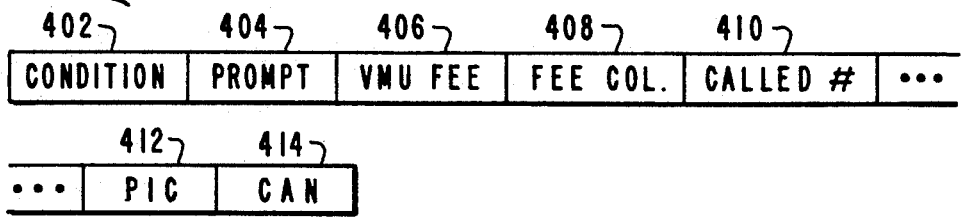
FIG. 13 illustrates the parameter field for service request messages.

When the subcommand field 398 indicates that the packet is a VMS service request, the parameter field includes the fields as illustrated in FIG. 13. The first field is a one byte condition field which indicates whether the service request message or packet is the result of a busy or a ring no answer, the second one byte field 404 indicates the type of prompt (that is, what human language) the VMS 34 is to use, which is related to the type of service accepted. The next two byte field 406 indicates the voice message fee. The following two byte field 408 indicates the amount of money actually collected. A called number field 410 is a variable length field which is null terminated and stores the number called by the pay telephone user. A variable length field 412 indicates the preferred carrier (AT&T, MCI, etc.) which the pay telephone user prefers and the last field 414 stores the credit card number and is a variable length field which is also null terminated.

A VMS service request message or packet is formatted, as illustrated in FIGS. 10, 12 and 13, is sent by the information services interface (ISI) CPU 42 when the pay telephone user accepts voice message service. In this situation the calling number, that is the number of the pay telephone, is the source address in the packet. The voice mail system (VMS) 34 replies with a VMS service reply packet formatted in accordance with FIG. 12 in which the parameter field is the 4-byte log-on token previously discussed. The ISI CPU 42 transmits the log-on token in-band, after establishing the voice connection with the VMS 34, also as previously discussed. The token identifies the call and relates the VMS 34 incoming voice line to the information in the service request packet received by the voice mail system 34. If the VMS 34 never receives a telephone call with this token, the token and its associated service request information packet will time out in the VMS 34. In this way, duplicate service requests are not a problem, however, the ISI CPU 42 must be prepared to receive and discard spurious service reply messages.

In addition to the above-discussed messages, the system protocol supports messages related to statistics, configuration, routing and alarms. With respect to statistics, the ISI CPUs 42 accumulate use statistics for the pay telephones they are monitoring. These statistics include such things as coin totals, attempted calls, classified call outcomes and so forth. This information is ultimately accumulated at a single site in the network which may either be the VMS 34 or one of the concentrators 46. This pay telephone information is independent of the statistics on voice message usage which are collected by the voice message system 34 based on voice message service requests. These statistics are collected and written into a sequential ASCII file containing one record per report per pay telephone line. These records are then available to a general purpose database system for the purpose of report generation. The ISI CPUs 42 do not report these statistics on a per call basis, but rather accumulate the data until the data is explicitly requested from the data collection site or until some per-line threshold is exceeded at the particular ISI CPU 42. In either event the information services interface (ISI) CPU 42 transmits a call statistics report to the collection site, and, upon reply from the collection site, deducts the reported totals from the current values, so as to not to lose any events. Within the statistic subcommands is a data request. This packet is sent to the ISI CPU 42 from the data collection site. The destination address specifies the telephone line for which counts are requested. The ISU CPU 42 replies with a statistics report packet which includes the time since the last statistics report, the number of calls attempted, the number of calls connected, the number of service offers for busy and ring no answer conditions kept separate, the number of service accepts for both conditions, the total voice message revenue, the number of coins collected for voice message service requests, the number of busy service offers, the number of busy service accepts, the total busy revenue and the total of busy coins collected, the number of VMS call attempts, the number of VMS calls completed, the number of VMS not available occurrences, the number of services abandoned situations, total time off hook and the totals for the nickels, dimes and quarters in the telephone box. The statistics report packet is responded to by the data collection node with a statistics acknowledgement packet which causes the ISI CPU to decrement the current counts by the counts saved in the last statistics report packet and to set the saved counts to zero. The statistics packets also include a set collection site subcommand which informs the data collection node (the ISI CPU) of the destination address to which statistics reports are sent. This packet must be acknowledged by a reply. A set threshold subcommand is also included within the statistics packets and is sent to the ISI CPU 42 by the configuration site or the statistics collection site. This command enables autonomous call statistics reporting by passing to the statistics collection site the threshold values on which reporting will be based. Whenever an actual count exceeds any of the thresholds in this packet, the autonomous statistics report packet will be generated which includes all of the statistics report items previously mentioned.

The system also provides configuration subcommands to read and set both global and per line parameters in the ISI CPU 42 and to manipulate the translation map and routing table 280. These commands are issued by the ISI configuration program which can run on the VMS system, one of the concentrators or any other node within the network and will be discussed in more detail later and is included in the appendix. The first command in the configuration group is a set parameter command which indicates to the destination to set a specified parameter to the specified value. A reply confirms that the value has been successfully set. In setting global parameters the ISI CPU 42 itself is addressed and to set line parameters the line card itself is addressed directly. Another subcommand within the configuration command set is the get parameter command which is sent to an object within the system and causes the object to return the parameter in the reply packet. Both global and per line parameters can be obtained in this way. Another command is the clear translation subcommand which clears the entire translate map 280 and should be addressed to an ISI CPU 42. An add translation subcommand adds an entry to the translate map. Any existing entry will be replaced. A corresponding delete translation subcommand deletes an entry from the map. A read translate table subcommand is also provided which requires that the addressed node reply with the contents of entire translation map.

The routing commands are a class of commands used to configure and reconfigure the network. These messages will normally originate from the configuration program. Note that nodes such as the ISI CPUs 42 and some voice message systems 34 which have only one port need no routing tables and none will be provided. Such nodes should not route packets at all and all packets originating at such nodes should be transmitted via the single port. A clear route command clears part three of the routing table 280 (the address-mask-port list), so that subsequently the node can only route packets via source routing, or to immediate neighbors. The add route command adds an entry to the routing table 280 for the given port. All entries with the same mask will be kept together, however, if a new mask is specified, the entry will be appended to the end of the table 280. A delete route subcommand deletes routing table entries. The routing commands also include a connect command which sets the address of the immediate neighbor on the specified port. As such, this is the way that new concentrators learn their identity. In response to this command, the node which receives the packet issues a set address command on the specified port. In this situation the connect command cannot be issued directly to the new concentrator since it does not know its address yet. This command also supplies the ISI line cards with their addresses, that is telephone numbers, and in this situation the connect message is addressed to the ISI CPU 42 and the port number is a line number. The addresses in this situation are supplied by the configuration program and they may be specified manually if desired or can be chosen automatically using the algorithm previously described. Of course, the VMS address (telephone number) and the ISI line card addresses (telephone numbers) must be chosen manually and this must done prior to applying the address selection algorithm. The person responsible for the configuration interacts with the configuration program to specify or modify a complete network configuration and a copy is permanently stored on the node running the configuration program. Once the configuration is complete the configuration program sends the appropriate connect commands in the appropriate order. These connect and add route commands are sent to all nodes in the network in the order of their distance from the node running the configuration program. The commands are first sent to the node running the configuration program which cause the configuration node to know its immediate neighbors and to send the neighbors set-address commands. Then connect and add route commands are sent to the immediate neighbors. This cycle continues until all nodes have been updated. The configuration program computes and uses source routes for all the routing commands it sends.

The ISI CPUs 42 can straight forwardly also accumulate alarm counts for the line cards they monitor. The alarm counts include counts for DTMF, coins, call progress, acceptance, host, and coin voltage. This information can be accumulated at a single site in the network which can be either the voice message system 34 or one of the concentrators 46. Just like the ISI statistics reporting, the ISI CPU's do not report the alarm counts on a per call basis, but rather accumulate the data either until they are explicitly requested to transmit the collected data or until a per line threshold is exceeded. The commands are substantially identical except for the fact that alarm threshold information is the subject. That is, the alarm packets include: a data request packet which is acknowledged with an alarm report packet, which provides the current statistics, which is acknowledged by an alarm acknowledgement, which decrements the current statistics by the amount of the previously transmitted alarm report, a set collection site packet which forwards the address to which the alarm statistics are to be sent and a set thresholds subcommand packet which sets the autonomous reporting thresholds for the various items of data collected.

Figure 14:
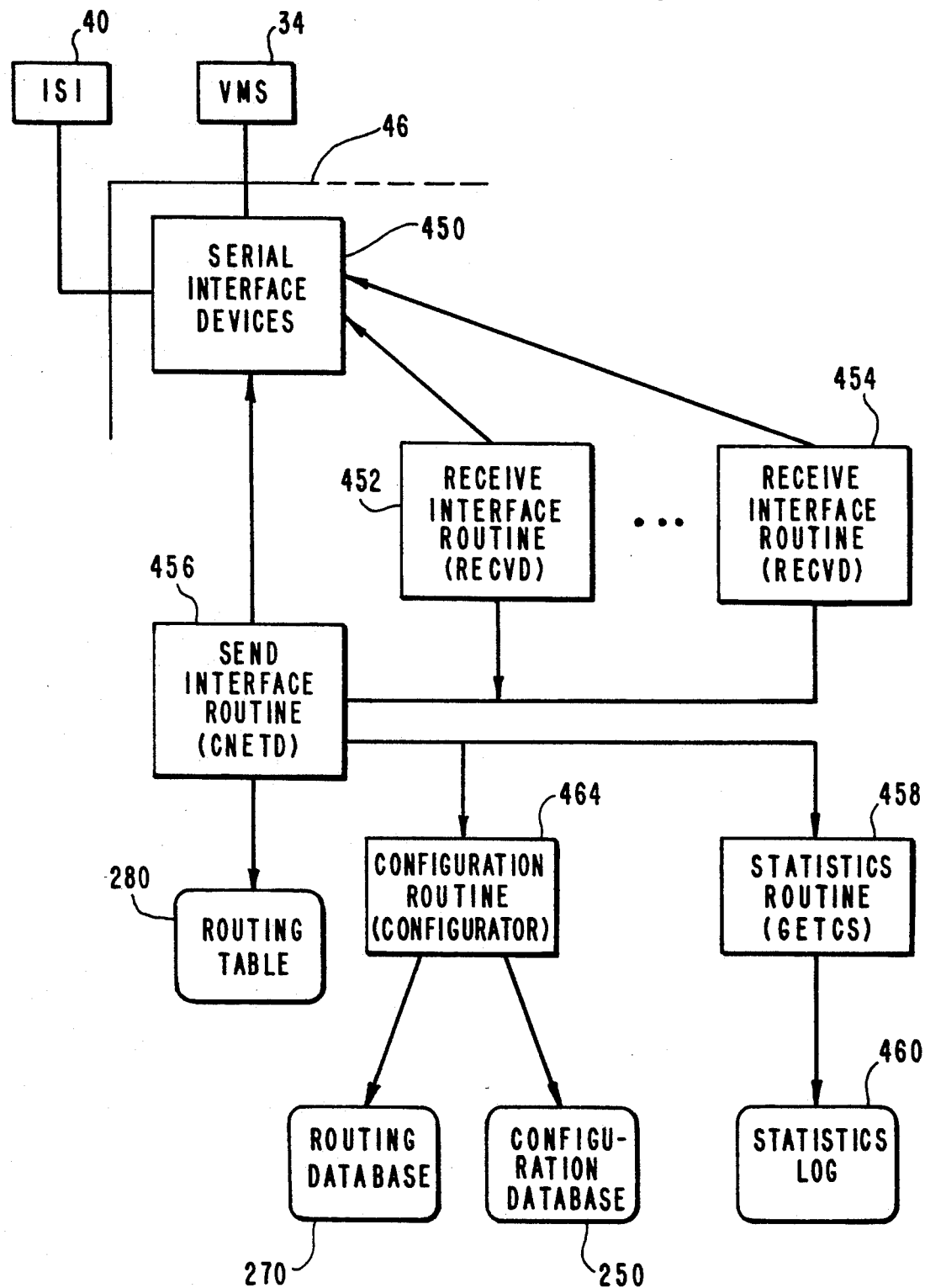
FIG. 14 is a diagram of the processes performed by a concentrator.

The primary function of the software executing in the concentrators 46 is to receive and route messages to the appropriate location whether that be a process within the concentrator itself or another object in the network connected to the concentrator by the serial devices 50, as illustrated in FIG. 14. The concentrator 46 includes receive interface routines 452 and 454 for each of the serial interface devices (modems, network interfaces, serial I/O interfaces) for which the concentrator 46 has interface cards. FIG. 14 in addition to providing the descriptive name of the routine also provides a mnemonic or acronym which indicates the name of the routine as used in the microfiche source code attached hereto. The receive interface routine 452 simply reads the serial line and buffers an incoming message until a complete message is received, and then sends the message packet to the send interface routine 456. The receive interface routine 452 and the send interface routine 456 communicate using the Xenix internal interprocess communication format discussed in more detail in the application 393,270 incorporated by reference herein. The send interface routine 456 acknowledges receipt of the packet through the port from which the packet was received. Then the send interface routine 456, in most situations, takes the packet and retransmits it through an appropriate serial interface device 450 toward the destination object. During this process the send interface routine 456 determines whether the packet includes a destination routing list and if so the packet is routed according to the port at the front of list. The packet is changed in size because the port number is removed from the destination list. If the packet does not have a destination routing list, the routine 456 compares the address to the masks in the routing table 280 until a match is found. The routine also adds the port through which the packet arrived to the source routing list. When the appropriate port, for transmitting the message through, is determined, the send interface routine 456 transmits the message through the appropriate serial interface device 450. At this time the send routine also prepares an appropriate alarm packet, if the packet cannot be routed for some reason. If the concentrator 46 determines that the packet is addressed to the concentrator, rather than another object in the network, then the send interface routine 456 activates the appropriate routines to comply with a command in the packet. For example, if the send interface routine 456 determines that the packet is for updating the routing table 280, the routing table is appropriately accessed and updated. If the routine 456 determines the packet is a reply to a routing command, the configuration routine 464 is activated so that it can inform the user in case of an error and proceed to issue subsequent routing commands. If the concentrator is the central statistics collection site and the send interface routine 456 determines that the command is a statistics message sending the current counts, the message is transmitted to the statistics routine 458 using the interprocess communication mechanism previously discussed. The statistics routine 458 will, for example, place the current counts in the statistics log 460 and create an appropriate message packet which includes the return routing information found in the statistics request message as the destination routing information within the link level message. The statistics routine 458 would also load the parameters field and the command 396 and subcommand 398 fields with the appropriate indicators indicating that the message is a reply message. The statistics routine 458 then provides the packet to the send interface routine 456 using the communication mechanism previously described. The send interface routine 456 treats the packet as if it were a packet received from the receive interface routine 452 and routes the packet through the appropriate serial interface device 450.

The statistics routine 458, when run in a statistics collection concentrator 46 periodically sends out statistics request packets. Each ISI responds with the current counts. This concentrator 46 could also send commands to the ISI's which would set autonomous count message thresholds which would result in the current counts being sent to the central site as the thresholds are crossed. The ISI, as previously discussed is, designed to generate such packets.

The concentrator 46 which performs network statistics collection is also preferably the concentrator which performs the network configuration functions. There are two main configuration functions performed by a configuration routine 464. The first allows a user to configure the ISI processor. The second is the function of configuring the routing of messages within the network. The routing function is performed by the configuration routine 464 based on commands by the user in conjunction with the routing database 270 and configuration database 250 previously discussed. This routine performs the operations necessary to create the masks for the routing table for those objects with more than one port. The routing algorithm, below in pseudocode, is based on the need to reduce routing table size through the use of a predefined list or set M of masks m where the masks are ordered from least specific to most specific as in the mask table below.

| MASK TABLE | | | | |
|---|---|---|---|---|
| No. | Type ID | Area Code | Exchange | Station |
| 1 | 00 | FFF | 000 | 0000 |
| 2 | 00 | FFF | FFF | 0000 |
| 3 | 00 | FFF | FFF | FF00 |
| 4 | 00 | FFF | FFF | 0FF0 |
| 5 | 00 | FFF | FFF | FFF0 |
| 6 | FF | FFF | FFF | FFFF |

The algorithm is designed for point to point communications using the shortest route between points and is designed to create a good but not necessarily optimal set of mask address pairs. The shortest path port number is determined using a conventional shortest path routine which determines the shortest path between two points in a network. The conventional shortest path routine is an algorithm with a straight forward recursive walk which at each step records the distance and the port number at each node visited. If upon revisiting a node, the new distance is less than the distance of the previous visit, the new port number is recorded as the shortest path to each address for the visited node.

The algorithm will create a mask for a set of addresses and if an exception is found later to the mask, a more detailed mask is created to catch the exception before the more general mask is encountered. The algorithm essentially searches for the ports with the highest number of common addresses and corrects for later discovered misroutings with the more specific masks. The goal is to produce minimal size routing tables and to consequently maximize the performance of the routing decisions made during normal operation by concentrators 46 and the VMS 34. The algorithm is heuristic in that the resulting tables are not necessarily the minimum size, but rather a near approximation to minimum size. The algorithm is space efficient, requiring only order n memory units where n is the number of addresses in the network. That is, the memory requirements grow only linearly with the size of the network. The algorithm is relatively time efficient where the time efficiency is order $n^2$ for each node routed. That is, the time required to make a routing decision grows as to square of the size of the network. When routing the entire network, the algorithm below is run independently on each node in turn, so that the time efficiency is order $n^3$. The pseudocode set forth below is provided to enhance the understandability of the description of how the algorithm operates, however, the source code for the algorithm can be found in the microfiche appendix and has the routine name fullRoutes.

PSEUDOCODE
for each m in M (ordered as described above) do:
    for each r in R, set r.checked to false -continued for each r in R in which r.checked remains false do:
    set all good, all bad, and totalbad to zero
    set ca to r.address & m
    for each r' in R for which r'.address & m equals ca do:
        if r'.routed then increment $bad_{r'.port}$ and totalbad
            else increment $good_{r'.port}$
        set r'.checked to true
    let p be the port which maximizes $good_p$-(totalbad-$bad_p$) in:
        for each r' in R for which r'.address & m equals ca do:
            emit routing packet to node N with mask m, address ca, and port p
            if r'.routed and r'.port is not p then
                set r'.routed to false
            else if r'.port equals p then
                set r'.routed to true The algorithm starts with a complete set of routes so that for each address in the system a port is assigned for sending packets to that address. The first step in the algorithm is to generate a set R of four-tuples for the node N, the node to be routed. Each element of set R is a four-tuple (address, port, routed and checked). The set R contains one four-tuple for each address in the network. The port member is the port number at node N which begins the shortest path to the address in question. The routed and checked members are Boolean values which indicate whether the address has been previously routed and checked. These variables are initially set to all false. The algorithm assumes a predefined set of masks and in the current implementation the masks 1, 2 and 6 in the table above are actually used. The additional masks 3-5 might be used for very large networks to enhance the minimization of the routing table. The algorithm assumes this predefined set of masks M, ordered from least specific to most specific and ending with the full mask, number 6. For a mask m in the mask set M, the expression m&a denotes the address a reduced by the mask m. The algorithm makes use of two integer vectors good and bad, which count occurrences of good and bad routings at various stages. These vectors have one entry each for each port p at node N. Particular entries in the vectors good and bad are referred to as $good_p$ and $bad_p$. In addition, the scalar vector ca records the current mask address under evaluation and a scalar integer totalbad counts potential misroutes at each step. The actual algorithm set forth in the source code appendix is implemented slightly differently in that the two inner "for each loops" (the ones which iterate on r') are actually combined into one by overlapping adjacent passes. This improves the time performance of the table generation algorithm, but unnecessarily complicates the description and understanding. One particular advantage of the algorithm is that if additions to the network are made, the addresses can be added to the most specific mask list, so that small changes in the network do not require rerunning the algorithm. Whenever a small change in the network occurs such as adding a new ISI node or changing some of the telephone numbers (addresses) at an existing ISI node, a full reroute is not necessary. A simple full-mask route is computed for each concentrator for each new or changed address and sent to the concentrator as it is completed. This is followed by the necessary configuration parameter updates. Whenever a large change such as adding a new concentrator occurs, a complete reroute of the entire network must be performed.

Figure 15:
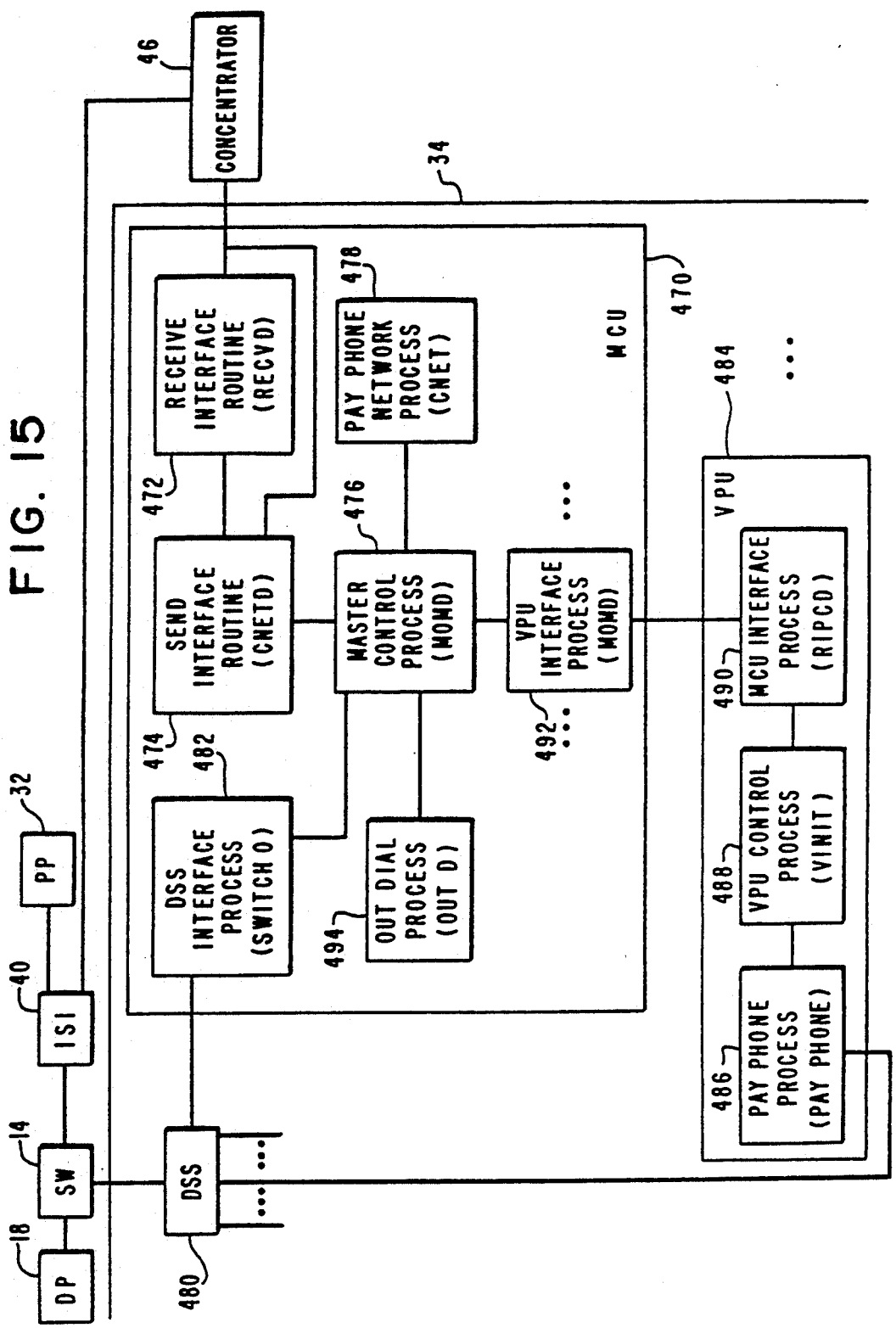
FIG. 15 is a diagram of the processes performed by the voice message system.

As illustrated in FIG. 15, when the pay telephone user at the telephone 32 accepts voice message service, the information services interface (ISI) 40 transmits a service request packet, as previously discussed, through the concentrator network to the voice message system 34. The receive interface routine 42 within the master control unit 470 receives the request packet and sends it to the send interface routine 456. In the voice message system 34, the send interface routine 474 forwards the service request to the master control process 476. The master control process 476 calls the pay telephone network process 478. This process 478, even though shown separately from the master control process 476 is actually a submodule within the master control process 476. The pay telephone network process 478 places the service request in a linked service request list and assigns the service request a number which is essentially a location number within that list. The pay telephone network process 478 uses that number as the token during creation of the service request reply packet. The pay telephone network process 478 essentially swaps the source and destination addresses in the service request packet and then changes the subcommand field to indicate that the message is a service request reply and replaces the contents of the parameters field with the token. The service request reply message is then forwarded to the send interface routine 474 which sends the service request reply message packet through the appropriate serial interface device to the concentrator 46 as previously discussed. The concentrator 46 forwards the message to the appropriate ISI 40 over the concentrator network. The service request list which includes the received service request messages includes, has associated with each request stored in the list a time stamp which is used by a garbage collection routine to traverse the linked service request message list to remove service requests which have not been responded to by the ISI 40 with an appropriate voice message telephone call. The ISI 40 upon receiving the token places an appropriate telephone call through the switch 14 to the voice message system (VMS) 34. When the central office switch (SW) 14 places an appropriate telephone call to the digital switching system 480 of the voice message system 34, the switch 14 preferably uses one of a number of local office trunks dedicated to the pay telephone voice message applications. The DSS (digital switching system) 480 indicates to the DSS interface process 482 that a telephone call has been received over a particular local area trunk. The DSS interface process 482 indicates to the master control process 476 which trunk has received a ringing signal. The master control process 476 through an internal configuration table recognizes that the trunk is a trunk dedicated to pay telephone messaging and instructs the DSS 480 to assign the telephone call to a line which will connect the call to a voice processing unit 484 which includes the pay telephone processing application process 486. The pay telephone application process 486 provides the appropriate answer DTMF signal or access acknowledgement through the DSS 480 and switch 14 to the ISI 40. The ISI 40 upon receiving the access acknowledgement from the pay telephone process 486 transmits a log-on message including the token using DTMF signalling back through the switch 14 and DSS 14 480 to the pay telephone process 486. The pay telephone process 486 forwards the token through the VPU (voice processing unit) control process 488 and the MCU (master control unit) interface process 490 to the master control unit 470 where the VPU interface process 492 forwards the token along with an indication of which pay telephone process 486 has accepted the message call to the master control process 476 and thereon to the pay telephone network process 478. The process 478 accesses the service request message list using the token number in the log-on message and transmits the information in the service request package necessary for taking the message and forwarding it on to the destination to the pay telephone process 486 through the processes 492, 490 and 488. The pay telephone process 486 then performs the appropriate message taking functions and terminates the call when the pay telephone user is finished. The pay telephone process 486 then forwards a request to the master control process requesting that the stored voice message be scheduled for transmission to the destination telephone 18. The master control process 476 provides the request to the out dial process 494 which places the request on an out dial process list. When the time for placing the call to the destination telephone 18 arrives the out dial process sends a command through the appropriate processes to the pay telephone process 486 to place the call to the destination telephone 18. This out dial call placement operation essentially places a telephone call through the DSS 480 and switch 14 to the destination telephone 18, plays the message, if the destination telephone 18 goes off hook, and reschedules the out dial process if the destination telephone 18 is busy or does not answer within a predetermined number of rings. This out dial operation, if a long distance call is involved, also includes performing the operations necessary to charge the voice message system for the call if the user deposited coins or to use the user credit card number for paying for message service. The completion of the message transmission process by the pay telephone process 486 results in the payphone process 486 deleting the message and notifying the outdial process 494 to delete the outdial request which has been performed.

Figure 16:
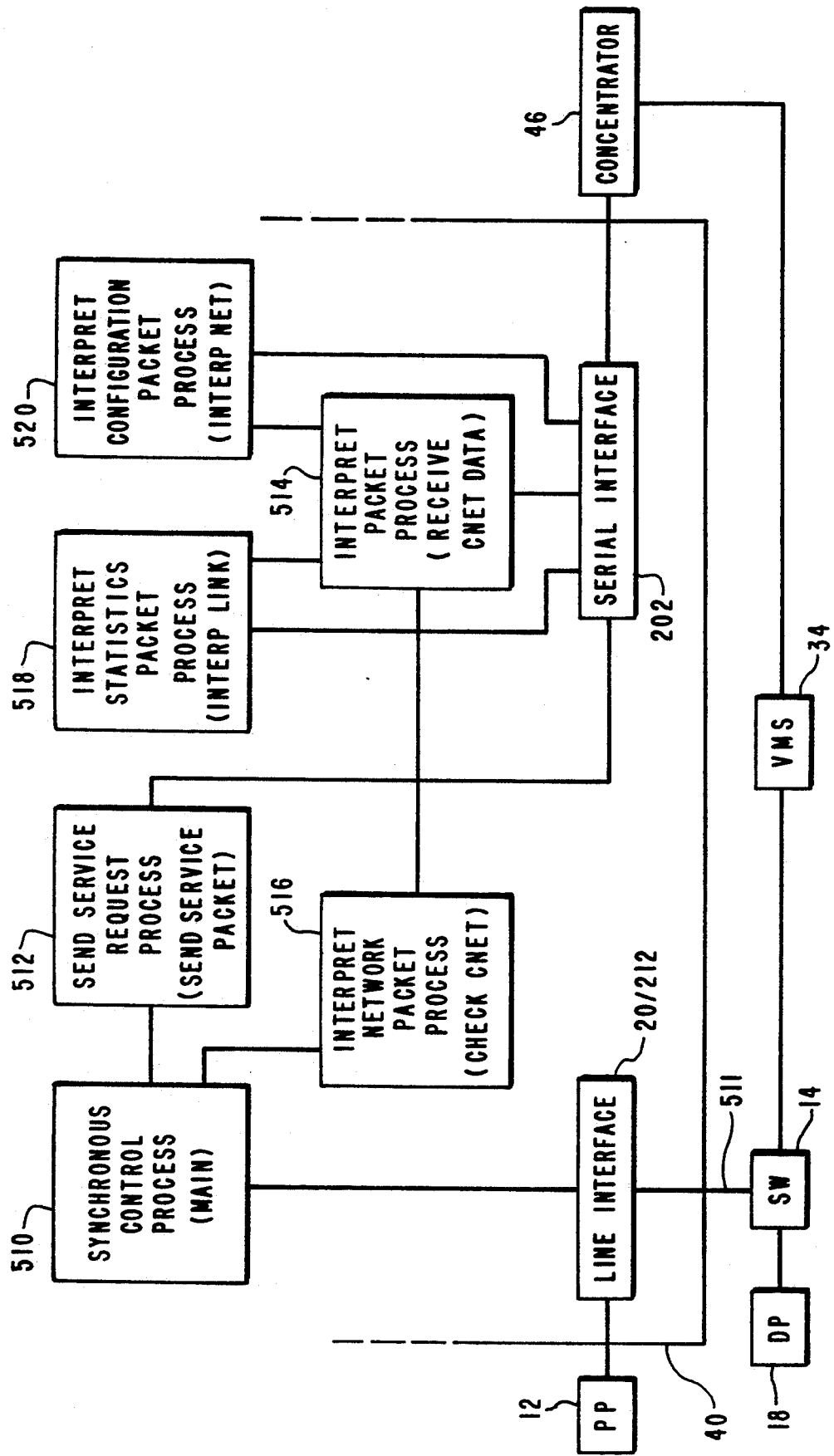
FIG. 16 is a diagram of the processes performed by the information services interface.

The interaction with the pay telephone 12 through the information services interface (ISI) 40 is controlled by a synchronous control process 510 as illustrated in FIG. 16. The synchronous control process 510 controls the telephone call in a conventional manner up until the point at which the pay telephone user accepts the pay telephone messaging service. Upon acceptance of service, the synchronous control process indicates to the send service request process 512 that a service request needs to be transmitted. The send service request process 512 prepares the appropriate service request packet in accordance with the format previously discussed and transmits it through the serial interface 202 and thereby through the concentrator 46 to the VMS 34. In the meantime, the synchronous control process 510 hangs up the telephone call currently in progress to the destination telephone 18 and reseizes the trunk 511 to the switch 14. When the switch 14 provides the dial tone to the line interface 20, the synchronous control process 510 sends the appropriate coin tones to the switch 14 and dials the voice message system (VMS) 34 through the switch 14. When the VMS 34 answers and provides a host start up digit or access acknowledgement, the synchronous control process 510 will send the token over the telephone network to the VMS 34 if the token has arrived through the concentrator 46. If the token has not arrived, then the synchronous control process 510 will transmit the information in the service request packet over the trunk 511 using DTMF signalling to the VMS 34. When the VMS 34 acknowledges the receipt of the token or the DTMF service request, the synchronous control process 510 connects the pay telephone 12 through to the VMS 34 and thereafter waits for an on-hook operation. When the on-hook by the pay telephone 32 is detected, the synchronous control process 510 sends an on hook signal to the switch 14 and returns to monitoring the pay telephone 32 for another pay telephone call. While the synchronous control process 510 is performing the synchronous operations associated with obtaining a telephone line connection to the VMS 34, the token from the VMS 34 arrives from the concentrator 46 and is provided to an interpret packet process 514 which determines whether the packet is a network packet, a statistics packet or a configuration packet. If the packet is a network packet, the packet is interpreted by a network packet process 516 which indicates to the synchronous control process that a token has arrived, if the packet is indeed a token packet. If the packet is a statistics packet, the interprets statistics packet process 518 is activated to handle the statistics packet in accordance with the previous discussion. If the packet is a configuration packet the interpret configuration packet process 520 is started to provide the appropriate response as previously discussed.

The translation map, previously mentioned, provides the ISI 40 with the ability understand the type of call being placed based on the digits dialed and how the call should be handled. The types of calls are: a) access through a common carrier (feature group calls), b) blocked, c) passive d) local coin, e) local credit, f) intra-lata coin g) intra-lata credit, h) inter-lata coin and i) inter-lata credit. Any blocked or passive calls are also subsets of the call types a and d-1. The blocked and passive calls are not acted upon by the ISI. As the telephone number signals are entered by the caller, the ISI 40 looks for match in its translation map. After it finds a match, the ISI takes the appropriate action as will be discussed with respect the FIGS. 17A–18B. The translation map contains the following possible telephone number patterns. Passive patterns are telephone numbers not to be intercepted and not offered voice store and forward. No action is taken by the ISI. Blocked patterns are telephone number patterns to prevent the caller from calling. When a blocked number is dialed, the ISI disconnects the payphone from the central office, hangs up the central office line and plays a prompt to the pay telephone caller indicating that the call cannot be completed as dialed. Class of service patterns are telephone number patterns to be intercepted and offered voice store and forward. There are 6 service classes each having a different method for processing the telephone call. The service classes are: CS0-local coin call, CS1-local credit call, CS2-intra-lata coin call, CS3-intra-lata credit call, CS4-inter-lata coin call, and CS5-inter-lata credit call. The map also contains the following information: the network address of the VMS, the telephone number of the VMS, the price of the voice store and forward service, the timing characteristics of the telephone loop current detection operation and the ownership of the intercept. The translation map also indicates to the ISI which prompts will be sent to the calling party. There are prompts for credit card ring no answer, busy calls, coin call ring no answer and busy calls, blocked calls and prompts such as "hold for one moment". In the access pattern for feature group B telephone numbers used to connect into an interexchange carrier, the number is usually a 950 or an 800 number and the payphone messaging can be offered to calls of this type. The passive classification is used to prevent pay telephone message service from being offered on either general calling patterns or specific called numbers for all class of service patterns. Class of service CS0 will convert the general passive classifications for selective numbers into numbers which will be allowed payphone message service. For example, a particular exchange could be provided with payphone messaging and all others set as passive locally. Class of service one (CS1) is for all local credit card calls. These calls are entirely processed by the local telephone company and are congruent to the local coin calls except for billing and digits called. This class of service is provided only for those exchanges that will be allowed credit card called payphone messaging service. Once again, individual exchanges or numbers can be isolated. Class of service 2 (CS2) is for all coin calls that exceed an initial rate or may be considered as toll calls. These calls may or may not be 1 plus calls. The list of exchanges that are not allowed to be phone messaging and class of service zero may be the exchanges that might be allowed payphone messaging in class of service 2. Class of service 3 (CS3) is for all credit card calls that exceed the initial rate or calls that may be considered as toll calls. The list of exchanges that are not allowed payphone messaging in class of service zero may be the exchanges that might be allowed payphone messaging in class of service 3. All specific intra-lata credit card call exchanges are allowed payphone messaging service in class of service 3. Class of service 4 (CS4) are intra-lata coin calls between area codes that are served by a common carrier. These calls will be delivered by the local operating company to the common carrier providing the service to the pay telephone. Class of service 5 (CS5) calls are credit card calls that will be delivered to the common carrier providing service to the payphone. Block numbers are numbers such as 900 numbers that are not allowed from payphones. These calls are restricted by the central office.

Figure 17:
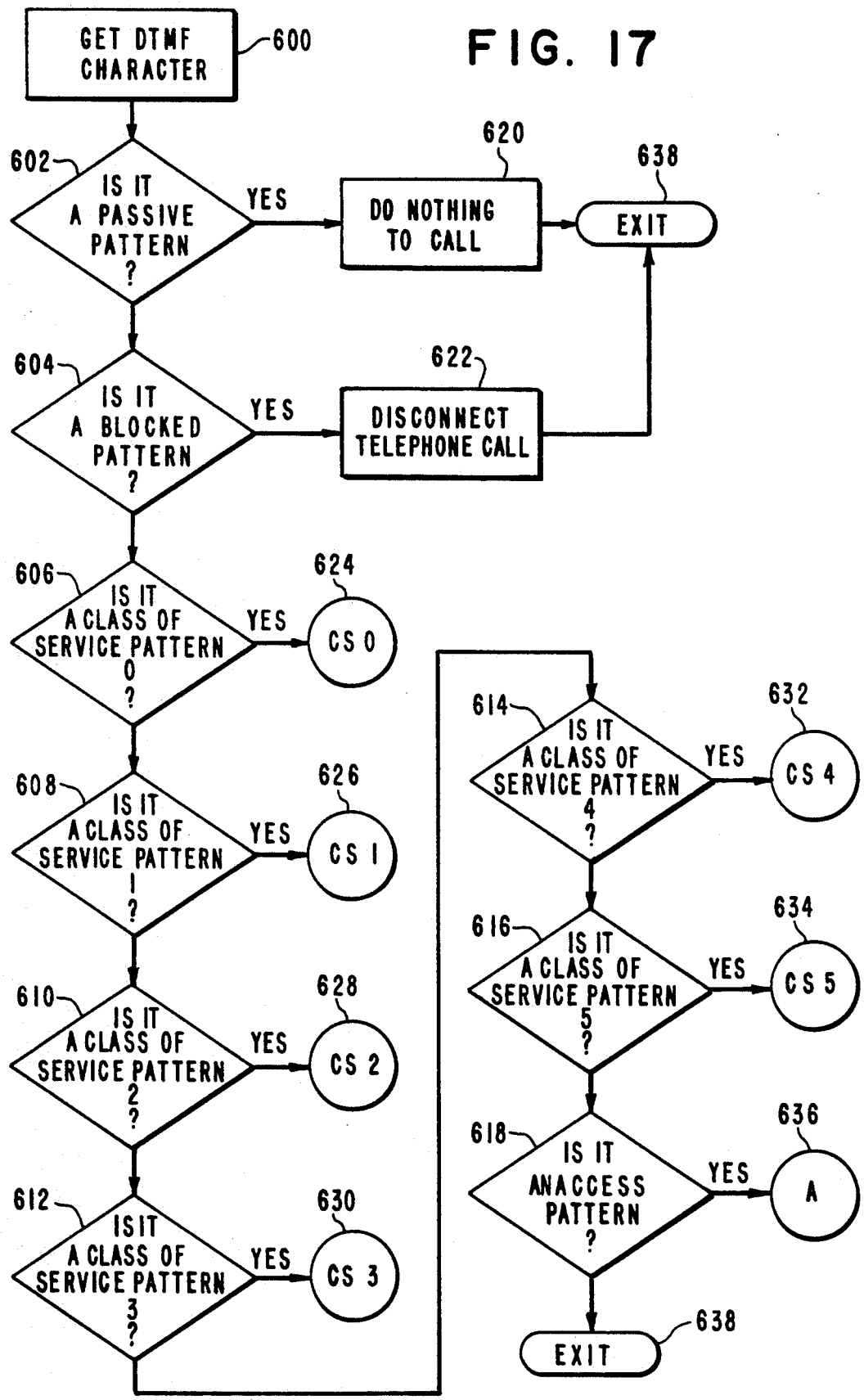
FIGS. 17-18 illustrate the operation of a translation table process.
Figure 18:
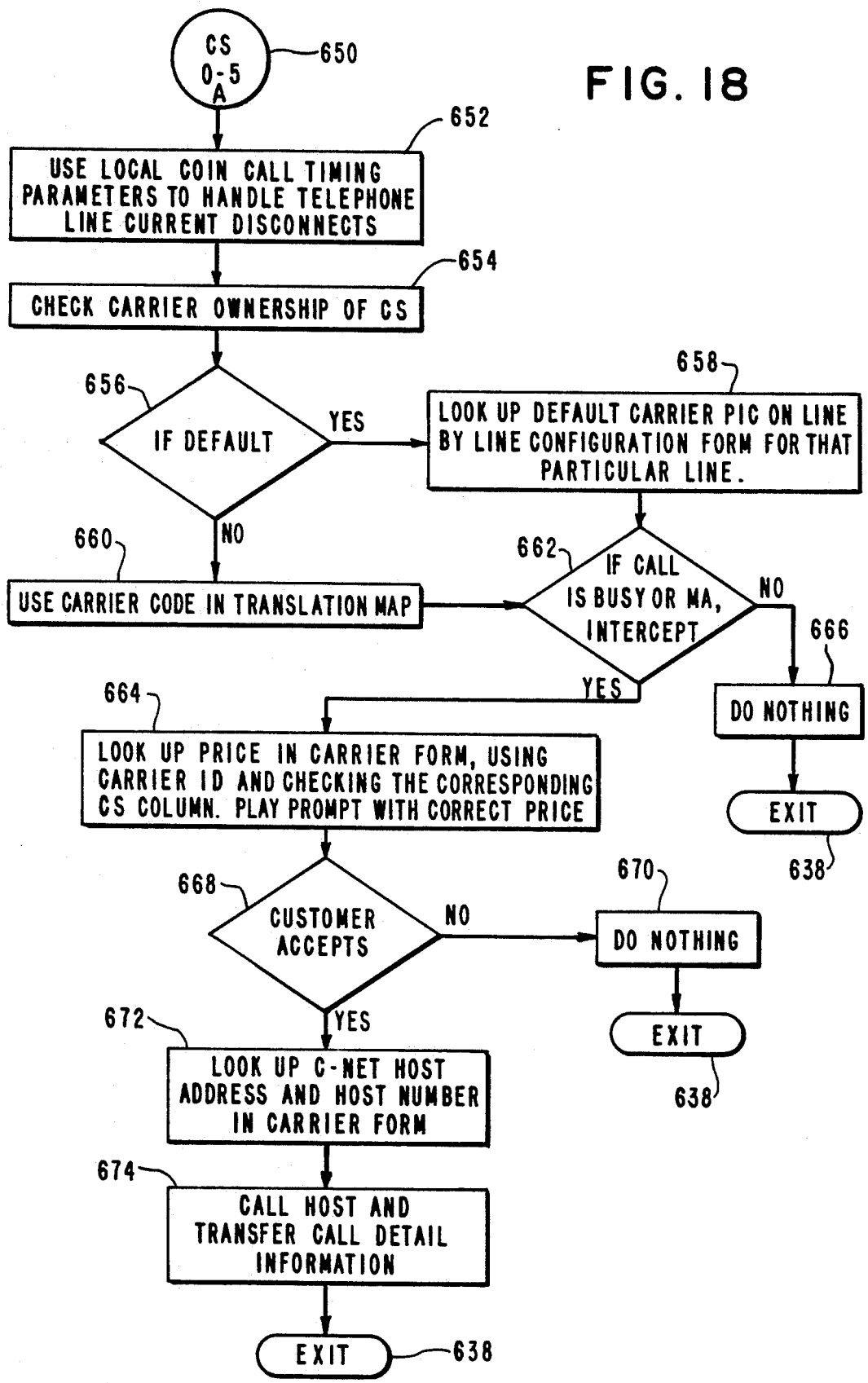

During operation, as illustrated in FIG. 17, the ISI first gets 600 the DTMF character and then tests 602–618 to determine the particular class of service. If the service is passive, nothing is done and the translation map routine exits. If it is a blocked pattern, the call is disconnected 622. If it falls within the other classes of service, the system branches to the appropriate class of service routine. An example of a class of service routine is illustrated in FIG. 18. The first step is to disconnect 652 the line using the local call timing parameters followed by a check to determine carrier ownership of the service. If there is a default value indicated 656, the default is determined 658. Otherwise the carrier code 660 of the translation map is used. If the call is determined to be busy, ring no answer and interceptable, then the routine determines 664 the proper prompt and provides that to the caller. Otherwise the system does nothing 666. Once the prompt has been provided to the customer, the customer either accepts 668 service or declines the service at which point the ISI does nothing 670. If the customer accepts the service, the processor determines 672 the host telephone number, transfers the call record information and places the call 674.

The invention has been described with reference to the VMS 34 sending a token over the out-of-band signalling network to the ISI 40 and the ISI 40 sending the token over the telephone connection to the VMS 34 correlating the service request with the incoming telephone call from the ISI 40. It is also possible to take advantage of the automatic number identification (ANI) capability of the smart central office switches 14 and use the pay telephone number as the token, thereby not requiring that the reply to the service request include a token. The pay telephone number received as the ANI digits before a telephone line is ringed would correlate the call information record received as part of the service request.

It is also possible for the concentrators to provide SMDI type switching information directly to the local central office switches 14 as the service request traverses the network to the VMS 34. The switching information would be used to establish the connection between the VMS 34 and the ISI 40 as the service request is being routed in an SS7 type connection approach, thereby, improving network usage efficiency and voice message system efficiency and removing the need for the token.

It is also possible for the VMS 34 to place a call to the ISI 40 over the telephone network when the service request is received also thereby removing the need for the token.

An alternative that increases the security of the system is to allow the in-band signalling from the ISI to the VMS only when the VMS has checked and confirmed that the link to the ISI over which the token is sent is down and the token cannot be sent to the ISI.

The routing algorithm creates a list of randomly ordered addresses for each mask. If a network gets sufficiently large so that the searching of the list associated with each mask becomes time consuming, a hash table could be created for each list which would speed up searching. Another alternative is to order the addresses in the list allowing a binary search to be very effective. A B-tree would also provide effective ordering, allowing a quicker search of the address list for each mask when the list gets large.

Even though the present invention has been described with respect to a single location performing statistics collection, it is possible for several different regions within a single network to perform statistics collection. That is, different pay telephone management offices would collect the statistics for the pay telephones in their region. This also applies to the regionalization of alarms. This is possible because statistics collection is driven by a list of pay telephone numbers whose statistics it should collect. The current list is from the information in the routing database. The substitution of a separate file of telephone numbers for driving statistics collection would allow multiple collection sites.

The many features and advantages of the invention are apparent from the detailed specification and, thus, it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention. For example, as messages are received by concentrators the return routing list could be kept in a very limited cache which would contain only the most recently used routes, allowing the system to avoid searching the complete routing table when the route exists in the cache.

What is claimed is:

1. A message communication system, comprising:
   interface means for determining whether a user has requested message service and producing a service request;
   communication means for carrying the service request via a service request channel responsive to the determination;
   a communications network having a switching system for carrying a voice message by the user via a voice channel independent of the service request channel of said communication means, said service request channel being independent of said switching system; and
   message processing means for processing the voice message carried by the network responsive to the service request from said communication means.

2. A system as recited in claim 1, wherein said message processing means comprises means for sending a call identifier to said interface means through said communication means, said interface means sending the call identifier over the network in the voice channel to said message processing means prior to the voice message.

3. A system as recited in claim 1, wherein said interface means includes means for collecting service request statistics and said communication means carries the service request statistics to a collection location.

4. A system as recited in claim 1, wherein said message processing means comprises:
   a digital switching system connected to the network; and
   a processor connected to said digital switching system and said communication means.

5. A message communication system, comprising:
   interface means for determining whether a user has requested message service and producing a service request;
   communication means for carrying the service request via a service request channel responsive to the determination, said communication means comprising a concentrator network of concentrators connected to said interface means, and said concentrators include routing means for routing the request using routing address masks identifying a route through said concentrator network for the service request;
   a communication network for carrying a voice message by the user via a voice channel independent of the service request channel; and
   message processing means, connected to said concentrator network, for processing the voice message carried by the communication network responsive to the service request from said communication means.

6. A system as recited in claim 5, wherein the request includes a source route field identifying a concentrator network route to a source of the request, a source address field specifying an address of the source, a destination route field identifying a concentrator network route to a destination of the request and a destination address field specifying an address of the destination.

7. A system as recited in claim 5, wherein one of said concentrators includes configuration means for assigning unique addresses to said concentrators and said interface means, producing the routing address masks for each concentrator and producing shortest routing paths.

8. A message communication system, comprising:

interface means for determining whether a user has requested message service and producing a service request;

communication means for carrying the service request responsive to the determination and comprising a concentrator network of concentrators connected to said interface means, and said concentrators include routing means for routing the request using routing address masks identifying a route through said concentrator network;

a communications network for carrying a voice message by the user;

message processing means for processing the voice message carried by the communications network responsive to the service request from said communication means; and administration means, located at a single node in said concentrator network, for administering said concentrator network and said interface means.

9. A message communication system, comprising:

interface means for determining whether a user has requested message service and producing a service request;

communication means for carrying the service request responsive to the determination and comprising a concentrator network of concentrators connected to said interface means, and said concentrators include routing means for routing the request using routing address masks identifying a route through said concentrator network;

a communications network for carrying a voice message by the user;

message processing means for processing the voice message carried by the communications network responsive to the service request from said communication means; and statistics means, located at a single node in said concentrator network for collecting statistics from said interface means.

10. A message communication system, comprising:

interface means for determining whether a user has requested message service and producing a service request;

communication means for carrying the service request responsive to the determination and comprising a concentrator network of concentrators connected to said interface means, and said concentrators include routing means for routing the request using routing address masks identifying a route through said concentrator network;

a communications network for carrying a voice message by the user;

message processing means for processing the voice message carried by the communications network responsive to the service request from said communication means; and configuration means, located at a single node in said concentrator network, for configuring said concentrator network.

11. A method of performing message service over communication means and a communication network including a switching system, comprising:

(a) transmitting a message service request over said communication means using a first channel, said first channel being independent of the switching system; and (b) transmitting a voice message over the network using the switching system via a second channel, said second channel being independent of the first channel, and storing the voice message after transmission over the network.

12. A method as recited in claim 11, further comprising:

(c) transmitting a reply including a message identifier correlating the message to the service request using the first channel; and (d) transmitting the identifier in the second channel over the network prior to transmitting the voice message in the second channel.

13. A method as recited in claim 13, further comprising (e) transmitting the service request over the network in the second channel used for transmitting the voice message when the message identifier is not received before a telephone connection is obtained to a voice message system.

14. A method of performing message service over a communication network, comprising:

(a) transmitting a message service request using a first channel, said service request comprising a destination telephone number, a destination address, a source address, a source routing list and a destination routing list;

(b) transmitting a voice message over the network;

(c) transmitting, over the first channel, a reply including a message identifier correlating the message to the service request and said reply including a destination address, a source address, a source routing list and a destination routing list; and (d) transmitting the identifier over the network prior to transmitting the voice message.

15. A method a recited in claim 14, wherein said service request further includes fee information, preferred carrier and credit card number.

16. A message communication system, comprising:

interface means for determining whether a user has requested message service and producing a service request;

communication means for carrying the service request responsive to the determination and comprising a concentrator network of concentrators connected to said interface means, and said concentrators include routing means for routing the request using routing address masks identifying a route through said concentrator network;

a communications network for carrying a voice message by the user;

message processing means for processing the voice message carried by the communications network responsive to the service request from said communication means; and an administration unit connected to said concentrator network, administering parameter changes in said interface means, statistics collection from said interface means and configuration of said concentrator network.

17. A message communication system, comprising:

interface means for determining whether a user has requested message service and producing a service request;

communication means for carrying the service request via a service request channel responsive to the determination said communication means including a routing table comprising:

an address of a neighbor in a data channel message service request network; and a linked list of routing masks corresponding to each address indicating the routing of the service request is to the neighbor;

a communications network for carrying a voice message by the user via a voice channel independent of the service request channel; and message processing means for processing the voice message carried by the network responsive to the service request from said communication means.

18. A message communication system, comprising:

interface means for determining whether a user has requested message service and producing a service request, said interface means including a translation map for a voice message pay telephone said interface means, comprising:

class of service indicators for each pay telephone; carrier identifications for the class of service; and price of message service for the class of service and ownership of a pay telephone intercept;

communication means for carrying the service request via a service request channel responsive to the determination;

a communications network for carrying a voice message by the user via a voice channel independent of the service request channel; and message processing means for processing the voice message carried by the network responsive to the service request from said communication means.

19. A pay telephone message system, comprising:

a telephone network;

a pay telephone communicating with a user and providing a user request for voice message storage and forward service;

a voice message storage system connected to said telephone network;

an information services interface connected between said telephone network and said pay telephone, determining whether a telephone call is interrupted for voice message service using a translation map, interrupting the telephone call to a destination telephone responsive to the user request, placing a call over the network to said storage system, sending a service request to said storage system and sending a call identifier over said network to said storage system when the service request is acknowledged by said storage system sending the call identifier to said interface; and a concentrator connected between said interface and said storage system, carrying the service request from said interface to said storage system and carrying the call identifier in the acknowledgement from said storage system to said interface after the service request is received by said storage system.

20. A system as recited in claim 19, wherein said concentrator comprises a concentrator network of concentrators each including a routing table for routing the service request and the call identifier using address masks identifying a route through said concentrator network for the service request and the call identifier.

21. A message communication system, comprising:

interface means for determining whether a user has requested message service and producing a service request;

a concentrator, connected to said interface means, for carrying the service request via a service request channel responsive to the determination;

a communications network for carrying a voice message by the user via a voice channel independent of the service request channel; and message processing means for processing the voice message carried by the network responsive to the service request from said concentrator.

22. A message communication system, comprising:

interface means for determining whether a user has requested message service and producing a service request;

communication means for carrying the service request via a service request channel responsive to the determination;

a communications network, separate from said interface means and having a switching system, for carrying a voice message by the user via a voice channel independent of the service request channel, said service request channel being independent of said switching system; and message processing means for processing the voice message carried by the network responsive to the service request from said communication means.

* * * * *

UNITED STATES PATENT AND TRADEMARK OFFICE
CERTIFICATE OF CORRECTION

PATENT NO. : 5,263,080
DATED : November 16, 1993
INVENTOR(S) : Scott A. Jones et al.

It is certified that error appears in the above-indentified patent and that said Letters Patent is hereby corrected as shown below:

Col. 5, line 44, "With" should be --with--.
Col. 8, line 49, after "packet" insert --.--.
Col. 13, line 5, after "must" insert --be--.
Col. 19, line 27, after "ability" insert --to--.
Col. 19, line 39, "the" should be --to--.
Col. 24, claim 13, should be numbered claim 15.
Col. 24, claim 14, should be numbered claim 13.
Col. 24, claim 15, should be numbered claim 14, and in
Column 24:
in the claim, "claim 14" should be --claim 13--.

Signed and Sealed this

Twenty-seventh Day of September, 1994

Attest:

BRUCE LEHMAN

Attesting Officer　　Commissioner of Patents and Trademarks